United States Patent [19]
Huignard et al.

[11] 4,456,327
[45] Jun. 26, 1984

[54] EXTENSIVE FIELD CAMERA

[75] Inventors: Jean P. Huignard; Marcel Malard, both of Paris, France

[73] Assignee: Thomson-CSF, Paris, France

[21] Appl. No.: 258,314

[22] Filed: Apr. 28, 1981

[30] Foreign Application Priority Data

May 8, 1980 [FR] France ................ 80 10246

[51] Int. Cl.³ ............................................ G03H 1/26
[52] U.S. Cl. ............................................ 350/3.6
[58] Field of Search .............. 307/425; 350/393, 3.64, 350/3.6; 358/2, 90

[56] References Cited

U.S. PATENT DOCUMENTS 3,551,594 12/1970 Enloe et al. .............. 350/3.5 X
3,670,098 6/1972 Korpel ....................... 178/6
3,745,476 7/1973 Mack ......................... 307/325

OTHER PUBLICATIONS

"Phase Conjugate Wavefront Generation via Real--Time Holography in $Bi_{12}SiO_{20}$ Crystals", by J. P. Huignard et al., Optics Letters, col. 4, No. 1, Jan. 1979, pp. 21-23.

Proceedings of the International Conference on Lasers, Dec. 11-15, 1978, "High Efficiency Phase-Conjugate Reflection in Germanium and in Inverted $CO_2$", by I. J. Bigio et al., pp. 531-537.

Primary Examiner—Bruce Y. Arnold
Attorney, Agent, or Firm—Oblon, Fisher, Spivak, McClelland & Maier

[57] ABSTRACT

A camera in accordance with the invention comprises a coherent light source from which is formed an object illuminating beam and a pumping radiation beam, and an interaction medium for receiving the pumping wave and the imaged wave reflected from the illuminated object. This medium diffracts in real time a replica of the imaged wave which is reflected from the object.

7 Claims, 5 Drawing Figures

EXTENSIVE FIELD CAMERA

BACKGROUND OF THE INVENTION

The invention relates to the field of the optical detection of objects and more specifically relates to an extensive field camera, based on the real time generation of a complex wave front, which strengthens the wave front coming from the object to be detected.

In general terms, such a camera comprises an optical system and a radiation detector. The optical system forms an image of the object on a detector, which can restore it directly, e.g. in the case of photographic emulsions, or indirectly via electrical signals, e.g. in the case of television. In the case of objects which are not in themselves luminous and which are not naturally illuminated object illumination means are added to the camera.

In the case of remote objects, it is advantageous to use infrared radiation, which is absorbed less by the ambient medium than visible radiation. However, in the infrared range, detectors have a relatively limited sensitivity.

In order to improve the detection sensitivity, attempts have been made to take advantage of the interference phenomenon between two coherent light waves and the development of the laser has made it possible to produce detection equipment based on this phenomenon.

In the case of plane waves, the detection signal-to-noise ratio is improved by heterodyning. This process consists of making the object wave front interfere with a reference wave serving as a coherent local oscillator, but which has a limited frequency shift compared with the object wave. The two plane wave surfaces made colinear via e.g. a semitransparent plate reach the square-law, opto-electrical detector either directly or via a collecting optical system and they then interfere in a coherent manner. In the case of parallel polarizations of the two waves on leaving the detector, the component at the difference frequency between the frequencies of the object wave and the reference wave has an amplitude which is proportional to the square root of the product of the optical powers of these two waves.

One of the main interests of this type of detection is the gain obtained with respect to the signal-to-noise ratio on working with a reference wave, whose power is well above that of the object wave. This gain compared with direct detection is equal to the ratio of the powers of the reference wave and the object wave.

However, this process has the disadvantage of giving rise to a detection in a field angle which is only open to a limited extent. The photocurrent emitted by the opto-electrical detector decreases very rapidly with the angle which can be formed between the object wave and the wave serving as the local oscillator. The attenuation of the signal with this angular separation is dependent on the wavelength, the diameter of the sensitive face of the detector and the aperture of the collecting optical system. For example, for a wavelength of 10 microns and a 10 cm diameter collector lens, a signal drop of 3 dB is obtained for an angular separation of $10^{-4}$ rad. For the formation of bi-dimensional images of objects, the number of discernable points is very limited and the process can only be used with difficulty.

This difficulty is overcome by the camera according to the invention which utilizes means for generating a wave having a complex wave front isomorphic with the object wave front to be detected.

Certain photosensitive media have the property of restoring in real time the replica of a random incident wave front and this replica can reproduce and maintain the phase of the incident wave front. By traversing the photosensitive medium and by cooperating with a reference wave or pumping wave the incident wave records there a diffraction grating. Following a recording time, the medium restores a replica of this wave containing part of the energy of the reference wave. On leaving this medium, the wave fronts of the incident wave and its replica can be exactly superimposed. Therefore, a perfect phase matching between the incident wave and its replica is obtained.

BRIEF SUMMARY OF THE INVENTION

The invention more specifically relates to an extensive field camera intended for the real time analysis of the image of an object, comprising a radiation source supplying an illumination beam of the object, optical means collecting a fraction of the radiation from the object in order to project the image of this object onto a radiation detector which analyses it, the coherent source supplying a pumping beam in addition to the object illuminating beam, the beam from the object and the pumping beam interfere in an interaction medium in which the spatial modulation of the light intensity resulting from the interference fringes gives rise to a spatial modulation of the refractive index in said medium, the system of layers resulting from this spatial modulation creating by partial diffraction of the pumping wave a wave front isomorphic to that emanating from the object.

BRIEF DESCRIPTION OF THE DRAWINGS

The invention is described in greater detail hereinafter relative to non-limitative embodiments and with reference to the attached drawings, wherein.

DETAILED DESCRIPTION OF THE PREFERRED EMBODIMENTS

Figure 1:
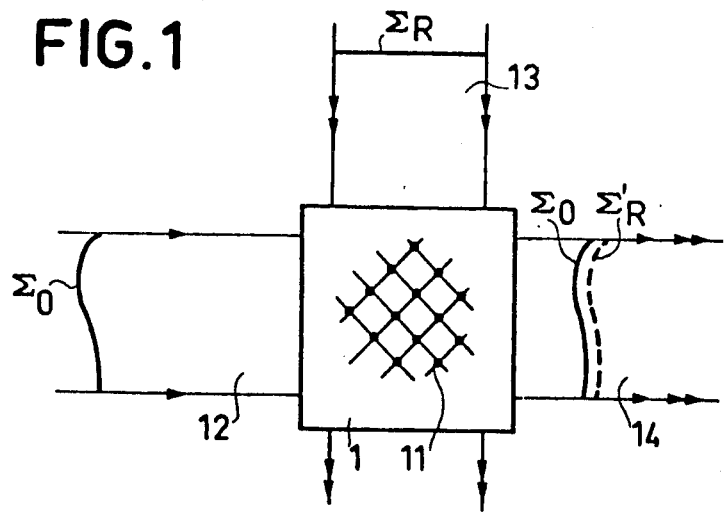
FIG. 1 is a block diagram of the operation of the photosensitive medium used in the camera according to the invention.

The camera according to the invention utilizes the interference between the incident wave and a pumping wave in an interaction medium. This interference provides the basis for the restoration in real time of a wave front with a complex morphology. This interference is produced in volume in a three-dimensional medium indicated by 1 in FIG. 1. In this medium, the dielectric constant and consequently the refractive index are spatially modulated by a system of fringes 11 resulting from the interference of the incident optical wave 12 of wave front $\Sigma_o$ and the pumping wave 13 of wave front $\Sigma_R$, e.g. which is planar. Due to the existence of this spatial modulation which induces a system of layers having a variable index, a fraction of the pumping wave energy is diffracted in the form of an emergent wave 14 of wave front $\Sigma_R'$ having characteristics which are isomorphic to those of incident wave and whereof part emerges from the medium along the wave front $\Sigma_o$ and in unchanged form.

Figure 2:
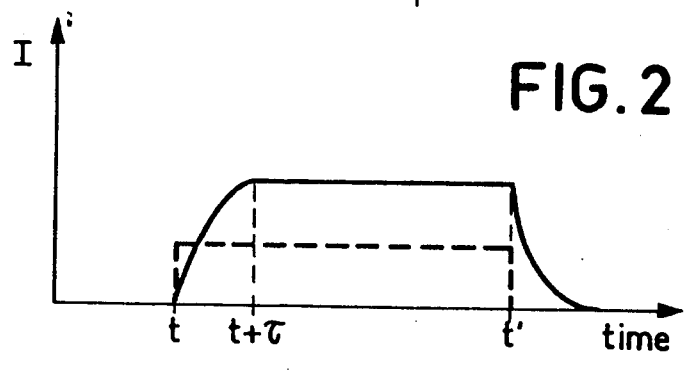
FIG. 2 is a diagram showing as a function of time the establishment of the replica wave emerging from said medium.

This restoration takes place in real time to within the recording time constant $\tau$, as is shown in FIG. 2, where the dotted line indicates as a function of time the intensity of the incident wave reaching the medium whilst the unbroken line indicates the intensity of the emergent wave $\Sigma_R'$. If t is the time when the incident wave $\Sigma_o$ starts to reach the medium 1, the emergent wave $\Sigma_R'$ is established at $(1-1/e)$ of its maximum value at time $t+\tau$. In the same way, on eliminating the incident wave $\tau_o$ at time $t'$, its replica $\Sigma_R'$ disappears exponentially and the system of layers is erased. As a function of the materials used for forming medium 1, the recording time constant $\tau$ varies from $10^{-3}$ to $10^{-12}$ seconds. This phenomenon is often called "dynamic holography" and the medium 1 is often called the "dynamic hologram support". In certain cases, the medium is also called a "non-linear interaction medium".

It is possible to use for the incident wave and the pumping wave displaced frequencies producing a sliding system of fringes. It is merely important that the inverse of the frequency shift is not too low compared with the time constant $\tau$ characterizing the establishment of a system of layers in the medium.

It is also pointed out that the intensity of the replica wave $\Sigma_R'$ sampled from the pumping wave has a value which is far from being negligible compared with that of the incident wave $\Sigma_o$ emerging from the medium.

The following media can be used as the non-linear interaction medium:

(a) transparent media which can be liquid, such as a carbon sulphide cell, or solid such as germanium wafers, said media being usable for wavelengths remote from the absorption band, i.e. up to about 10 microns;

(b) semiconductor materials such as Si, CdTe, Hg Cd Te or gaseous media (sodium vapour) used in the vicinity of the absorption band;

(c) the actual laser media such as the YAG, RUBY or $CO_2$ laser usable at the inherent wavelength of the laser;

(d) photoconductive electro-optical materials such as BSO (bismuth and silicon oxide) or BGO (bismuth and germanium oxide).

For the first three categories of materials the dynamic hologram recording requires high power densities on the pumping beam of 10 $mWcm^{-2}$ to 1 $kWcm^{-2}$.

For the final category, the index modulation results from the simultaneous presence of a space charge effect and the linear electro-optical effect (photorefractive effect). The requisite power densities are low and specifically 1 to 10 $mWcm^{-2}$ for the wavelength $\lambda=0.5$ micron.

Thus, the camera according to the invention uses such a medium for obtaining a replica of the wave coming from the object. When directed towards the detector, like the wave coming from the object after it has passed through the non-linear medium, this replica, whose amplitude is added to that of the wave coming from the object increases the detectable intensity. Everything takes place as if the object wave had been amplified.

Figure 3:
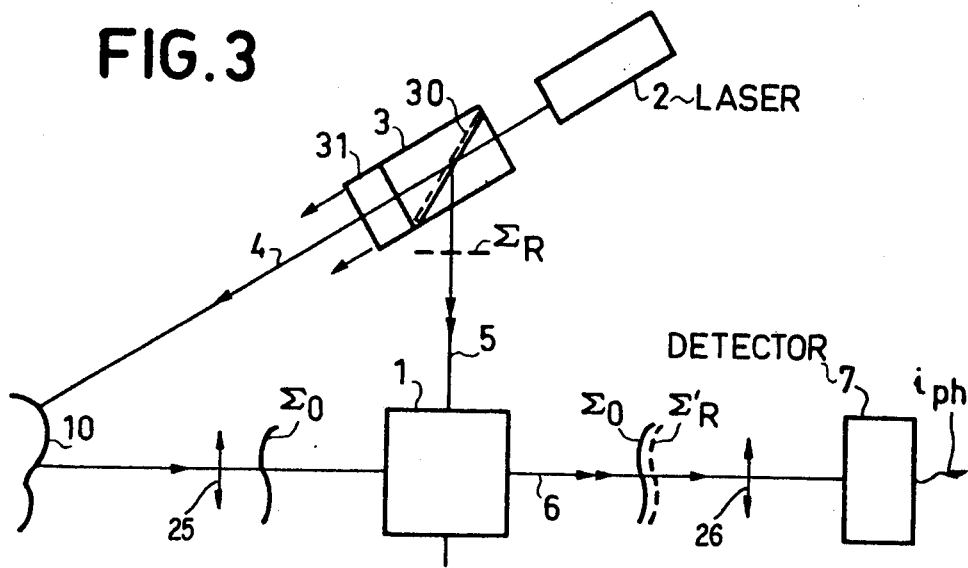
FIG. 3 is a diagram of the camera according to the invention.

A block diagram of the camera using a homodyne detection mode is shown in FIG. 3. A laser 2 transmits a parallel beam to an illuminating device 3. This device comprises a semitransparent plate 30 which divides the beam from the laser into a beam 4 which is to illuminate the object and into a pumping beam 5. This device 3 also comprises optical means 31 enabling beam 4 to illuminate object 10. The beam emerging from object 10, collected by lens 25, reaches the dynamic interaction medium 1 with a wave front $\Sigma_o$, whose shape is dependent on that of the object and the refringent properties of the traversed medium. Pumping beam 5 with the e.g. planar wave front $\Sigma_R$ also reaches the medium 1.

The object wave of wave front $\Sigma_o$ and the pumping wave of wave front $\Sigma_R$ interfere in volume in medium 1 and induce a system of layers therein. After a certain establishment time, medium 1 diffracts replica $\Sigma_R'$ as well as object wave $\Sigma_o$ and both are collected by lens 26 and directed towards the detector 7.

This device has two features making it particularly suitable for carrying out heterodyning with respect to the detection of the image. One of the features is that on leaving the interaction medium, the wave fronts of the waves coming from the object and their replica are isomorphic. If the pumping wave is constituted by two waves at time frequencies $\omega_0$ and $\omega_1 = \omega_0 + \Delta\omega$, medium 1 diffracts a replica of the object wave of unchanged morphology, but reproduces the frequency shift $\Delta\omega$ of the two pumping waves. The prerequisite for this reproduction is that the lighting variation period due to the frequency difference between the two waves $\omega_0$ and $\omega_1$ is not too low compared with the time for establishing the layers.

The other feature relates to the replica wave power. For most photosensitive media which can be used, the dynamic hologram is induced by a high power density on the pumping beam. If the interaction is effective, the intensity of the diffracted wave, i.e. of the object wave replica $\Sigma_R'$ and which constitutes the "local oscillator" is far from being negligible as compared with the intensity of the object wave. Thus, the conditions are such that it is possible to obtain a heterodyne detection with an extensive field leading to a significant improvement in the signal-to-noise ratio.

As the object wave and local oscillator wave are frequently-displaced, the detection is centred on the difference frequency.

Figure 4:
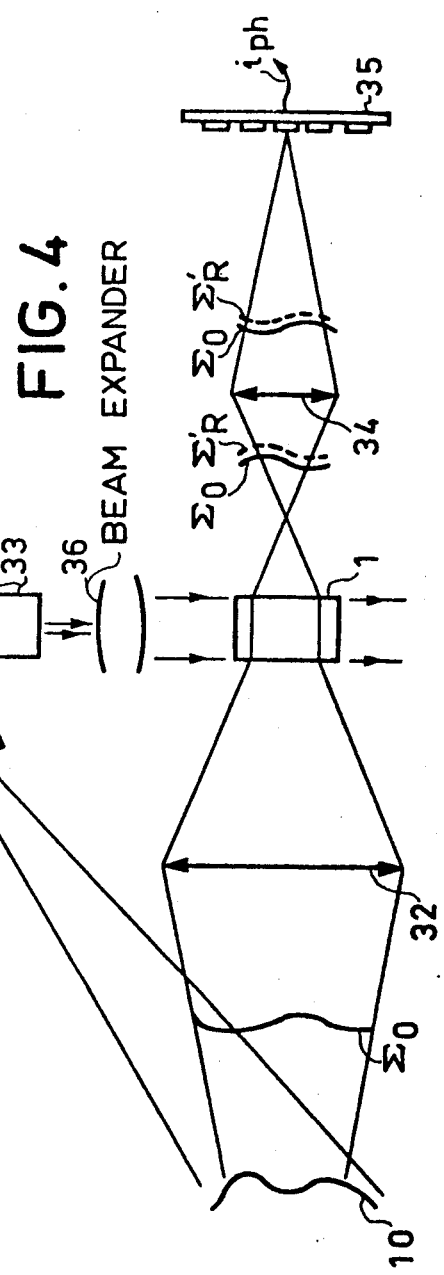
FIG. 4 is an embodiment of the camera according to the invention.

An example of matching the camera according to the invention to heterodyne detection is shown in FIG. 4. In this embodiment, the two pumping waves are generated at frequencies $\omega_0$ and $\omega_1 = \omega_0 + \Delta\omega$ by introducing an acousto-optical modulator or an electro-optical phase modulator. It is also possible to introduce these components on the illuminating wave or on that coming from the object.

The heterodyne detection device shown in FIG. 4 comprises a laser 2 emitting parallel radiation in the direction of a semitransparent plate 30. The radiation 4 transmitted by the semitransparent 30 is received on an optical system 31, giving it a sufficient aperture for illuminating the complete object 10. Each point of the object diffracts the wave towards an optical system 32, which concentrates this object beam of wave front $\Sigma_o$ to the interaction medium 1.

Radiation 5, reflected by the semitransparent plate 30 traverses an acousto-optical cell 33, which generates the two waves at frequencies $\omega_0$ and $\omega_0 + \Delta\omega$ and reaches the interaction medium 1, after expansion by the beam expander 36. In this medium, it cooperates with the object beam for a time $\tau$ in the establishment of layers, whereby time $\tau$ must not be too great compared with the lighting variation period. Following the recording phase $\tau$, medium 1 restores, with object wave $\Sigma_o$, the replica $\Sigma_R'$ of object wave $\Sigma_o$ which forms a "local oscillator" having isomorphism for the extensive field heterodyne detection of the wave front of object 10.

The beam leaving the interaction medium 1 and containing wave fronts $\Sigma_o$ and $\Sigma_R'$ is collected by lens 34, which forms on a mosaic of opto-electrical detectors 35 an image of object 10. Each detector of the mosaic detects an area which corresponds to a small portion of object 10. Advantageously, the detectors detect the optical signal at the difference frequency of the object wave and the local oscillator. Finally, this mosaic of detectors 35 generates electrical signals making it possible to reproduce a bidimensional image of the object.

In this device, it is possible to eliminate speckle due to the use of the coherent light, e.g. by equipping the lighting device 3 with a rotary diffuser.

Figure 5:
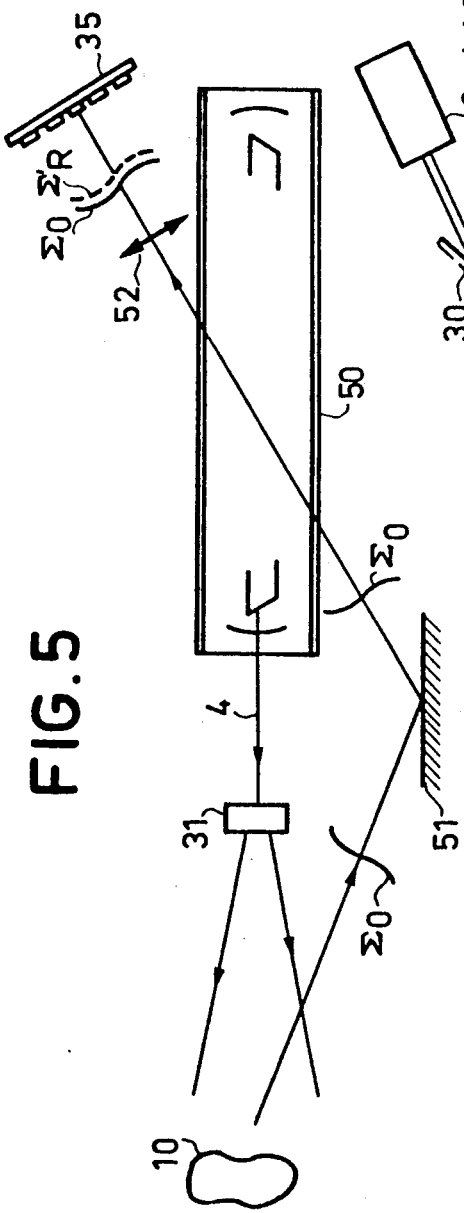
FIG. 5 is a diagram of another embodiment.

Another embodiment of the device is shown in FIG. 5. In this embodiment, the actual laser is used as the non-linear interaction medium. It is a carbon gas laser 50, which emits parallel radiation to the lighting device 31. Device 31 diverges the beam in order to illuminate the complete object 10.

This illuminated object diffuses an object wave $\Sigma_o$ which, by means of mirror 51, reaches the laser cavity where it cooperates with the inherent radiation of the laser within the cavity in order to establish there the system of layers. The angle of incidence must be as low as possible to ensure that there is a very significant average pitch of the fringes. Following the system establishment time $\tau$, the laser cavity restores, with object wave $\Sigma_o$, the replica $\Sigma_R'$ of said wave. The replica waves energy is taken from the intra-cavity radiation of the laser.

Everything takes place as if the object wave $\Sigma_o$ was amplified, which facilitates the detection of object 10 on detector 7, where its image is formed via optical system 52.

In the embodiment where the laser medium is used as the dynamic hologram support medium, it is also possible to use the detection heterodyning procedure. As the pumping wave is the actual laser radiation with its inherent frequency, it is a question of introducing the frequency variation on the object illuminating wave by e.g. placing an acousto-optical cell between the laser output and the illuminating device 31. Speckle can also be eliminated by integrating a rotary diffuser into the illuminating device.

What is claimed is:

1. A field camera system intended for the real time analysis of the image of an object, comprising:
    a coherent radiation source means supplying an illumination beam of the object and a pumping beam;
    optical means, including an interaction medium, for receiving said pumping beam and an imaged reflected beam resulting from said illumination beam of the object whereby said imaged reflected beam and said pumping beam interfere in said interaction medium in which the spatial modulation of the light intensity resulting from interference fringes produced by said interference gives rise to a spatial modulation of the refractive index in said medium with a system of layers resulting from said refractive index spatial modulation creating by partial diffraction of the pumping wave a wave front isomorphic to the wave front of said imaged reflected beam.

2. The system according to claim 1, wherein said system of layers are stationary in order to produce homodyne detection.

3. The apparatus according to claim 1, further comprising frequency changing means placed in one of a path of said illumination beam and a path of said pumping beam with said frequency changing means producing a frequency shift such that the inherent time constant of said interaction medium establishes said system of layers despite the sliding of the interference fringes caused by said frequency changes.

4. The system according to claim 3, wherein said frequency changing means comprise one of an acousto-optical cell and an electro-optical phase modulator which is placed in the path of said pumping beam between said source and said interaction medium.

5. The system according to claim 1, wherein said frequency changing means comprises an acousto-optical cell inserted in the objecting lighting beam path.

6. The system according to claim 1, further comprising a detector means including one of a mosaic and a line of detectors supplying an electrical image of said object.

7. The system according to claim 1, further comprising a rotary diffuser placed in the object illuminating path which makes it possible to eliminate the speckle due to said coherent radiation source.

* * * * *